United States Patent
Grimm et al.

(10) Patent No.: US 8,186,103 B2
(45) Date of Patent: May 29, 2012

(54) SLIDING WINDOW ASSEMBLY

(75) Inventors: Rainer Grimm, Frankfurt (DE); Donald Monroe, Dearborn, MI (US); Justin LaBorde, Ypsilanti, MI (US); Sheleena Totharam, Farmington Hills, MI (US); John Raasakke, Howell, MI (US); Santhosh K. Shivayogi, Bangalore (IN)

(73) Assignee: Body Systems USA, LLC, Troy, MI (US)

( * ) Notice: Subject to any disclaimer, the term of this patent is extended or adjusted under 35 U.S.C. 154(b) by 385 days.

(21) Appl. No.: 12/372,059

(22) Filed: Feb. 17, 2009

(65) Prior Publication Data

US 2009/0217595 A1    Sep. 3, 2009

Related U.S. Application Data

(60) Provisional application No. 61/032,198, filed on Feb. 28, 2008.

(51) Int. Cl.
*E05D 15/10* (2006.01)

(52) U.S. Cl. ............................................. 49/213; 49/413

(58) Field of Classification Search .................... 49/213, 49/413, 380
See application file for complete search history.

(56) References Cited

U.S. PATENT DOCUMENTS

| | | | | |
|---|---|---|---|---|
| 4,919,475 A | * | 4/1990 | Schlapp et al. | 296/213 |
| 5,542,214 A | * | 8/1996 | Buening | 49/380 |
| 5,724,771 A | * | 3/1998 | Gipson | 49/449 |
| 5,996,284 A | * | 12/1999 | Freimark et al. | 49/209 |
| 6,497,072 B2 | * | 12/2002 | Fries | 49/209 |
| 6,691,462 B2 | * | 2/2004 | Oestermann | 49/213 |
| 2005/0044799 A1 | * | 3/2005 | Kinross et al. | 49/413 |
| 2006/0032140 A1 | * | 2/2006 | Arimoto et al. | 49/209 |
| 2006/0260205 A1 | * | 11/2006 | Dufour et al. | 49/413 |

FOREIGN PATENT DOCUMENTS

| | | | |
|---|---|---|---|
| EP | 0916794 A2 | * | 5/1999 |
| EP | 1084879 A2 | * | 3/2001 |

* cited by examiner

*Primary Examiner* — Katherine w Mitchell
*Assistant Examiner* — Justin Rephann
(74) *Attorney, Agent, or Firm* — Cantor Colburn LLP

(57) ABSTRACT

A sliding window assembly includes a fixed window panel and a sliding window panel that is movable along a guide rail relative to the fixed window panel between an open position and a closed position. A window frame is fixed to the sliding window panel and includes a first guide feature. A locking frame is coupled to the window frame and includes a second guide feature. The guide rail, in cooperation with the first and the second guide features, initially guides the sliding window panel to an offset position relative to the fixed window panel, and then guides the sliding window panel in a lateral direction to uncover an opening in the fixed window panel. A locking mechanism cooperates with the locking frame to selectively lock the sliding window panel to the guide rail.

20 Claims, 7 Drawing Sheets

SLIDING WINDOW ASSEMBLY

RELATED APPLICATION

This application claims priority to U.S. Provisional Application No. 61/032,198, which was filed Feb. 28, 2008.

TECHNICAL FIELD

This invention generally relates to a vehicle window with a sliding panel that is positioned to be flush with the vehicle window when closed.

BACKGROUND OF THE INVENTION

Windows for vehicles, such as pick-up trucks or vans for example, often include a large rear or side fixed window with an opening that is selectively covered and uncovered by a movable window panel to provide ventilation within an interior of the vehicle. When closed, the movable window panel is positioned within the opening such that the movable window panel is flush with the fixed window. The movable window panel is then moved to an offset position, i.e. a non-flush position, to provide ventilation by uncovering the opening. The movable window panel can then be slid along a track or guide rail to completely uncover the opening.

Such window configurations provide challenges for packaging locking mechanisms and guide mechanisms to control movement of the movable window panel. These mechanisms must be able to withstand wind loads when the movable window panel is in the offset or fully open positions. Further, the overall window assembly must be tightly sealed and the locking mechanism should be configured to deter theft. Also challenging is packaging the guide and locking mechanisms to maintain an aesthetically pleasing appearance for the vehicle window. More cost effective solutions and simplified hardware configurations are continually sought after to address these challenges.

SUMMARY OF THE INVENTION

A sliding window assembly includes a fixed window panel with an opening that is covered and uncovered by a sliding window panel that is movable along at least one guide rail. A first frame is fixed to the sliding window panel and includes a first guide feature. A second frame is coupled to the first frame and includes a second guide feature. The guide rail, in cooperation with the first and the second guide features, initially guides the sliding window panel to an offset position relative to the fixed window panel and then guides the sliding window panel to uncover an opening in the fixed window panel. A locking mechanism cooperates with the at least one of the first and second frames to selectively lock the sliding window panel to the guide rail.

In one example, one of the first and second guide features comprises a plurality of guide pins and the other of the first and second guide features comprises a plurality of guide slots. One guide pin is received within each guide slot.

In one example, the guide rail includes first and second guide grooves that receive the guide pins. The first and second guide grooves each include a laterally extending portion that extends along a substantial length of the at least one guide rail and an angled portion that extends at an oblique angle relative to the laterally extending portion. The guide pins are moveable within the angled portion to move the sliding window panel to the offset position, and are then subsequently moveable within the laterally extending portion to uncover the opening in the fixed window panel.

In one example, the locking mechanism includes a lock member and a resilient member that biases the lock member to a locked position. The lock member is fixed to the second frame and includes a portion that is actuated, such as by a press-force for example, to unlock the locking mechanism such that the sliding window panel can be opened. The locking mechanism provides a simple and effective theft deterrent.

These and other features of the present invention can be best understood from the following specification and drawings, the following of which is a brief description.

DETAILED DESCRIPTION OF THE PREFERRED EMBODIMENT

Figure 1:
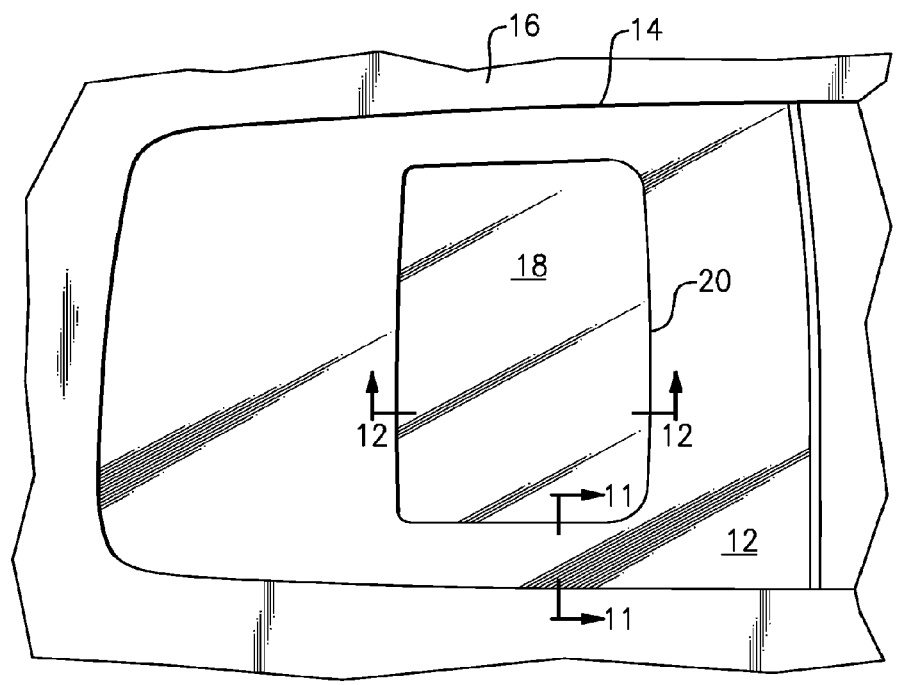
FIG. 1 is a schematic side view of a vehicle with a sliding window assembly.

A fixed window panel 12 is mounted within an opening 14 formed in a vehicle body 16. A sliding window panel 18 covers an opening 20 in the fixed window panel 12. In the example shown in FIG. 1, the fixed window panel 12 comprises a side window for a van; however, the fixed window panel 12 and sliding window panel 18 could be located in other positions within the vehicle.

In the example shown, the fixed window panel 12 comprises a large single-piece of glass that is cut to have an opening of a desired size. The cut-out glass comprises the sliding window panel 18 that is then mounted in a sliding configuration to selectively cover and uncover the opening 20.

Figure 2:
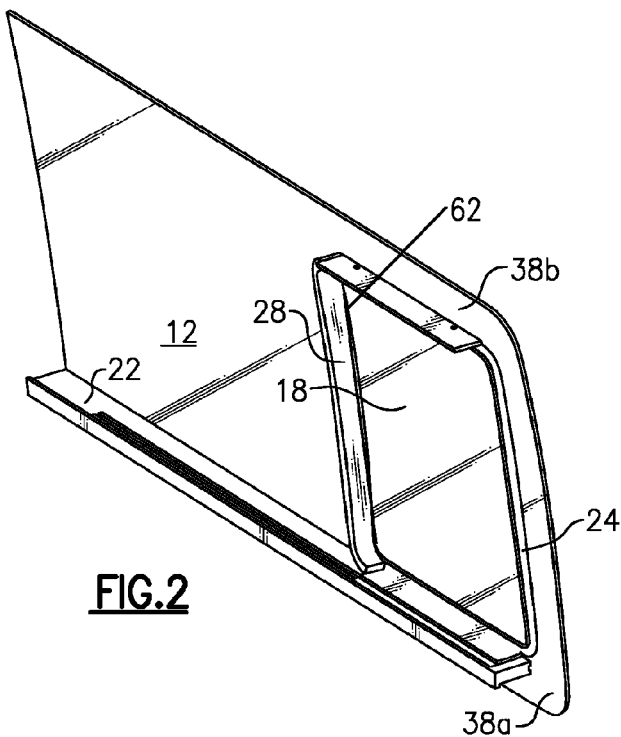
FIG. 2 is a perspective inside view of the sliding window assembly of FIG. 1.
Figure 3:
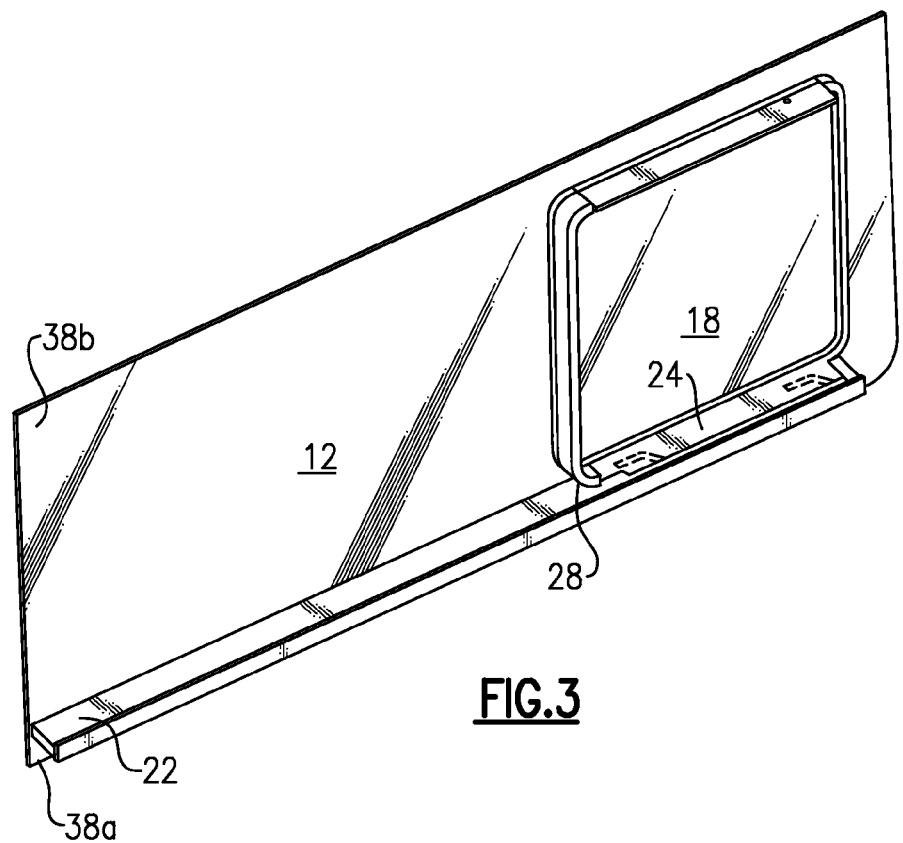
FIG. 3 is another perspective inside view of the sliding window assembly of FIG. 1 viewed from an opposite direction.

FIGS. 2 and 3 show perspective views from different ends of the sliding 18 and fixed 12 window panels. At least one guide rail 22 is mounted to extend along one edge of the fixed window panel 12. In the example shown, the guide rail 22 extends along a bottom edge 38a of the fixed window panel 12; however, the guide rail 22 could be located along a top edge 38b, or two guide rails 22 could be used with one guide rail 22 being mounted at the top edge 38b and one guide rail 22 being mounted at the bottom edge 38a.

The sliding window panel 18 is generally flush with the fixed window panel 12 when the sliding window panel 18 is in the closed position with the opening 20 covered. To uncover the opening, the sliding window panel 18 is first moved inwardly away from the fixed window panel 12 to an offset or non-flush position. Then the sliding window panel 18 can be slid in second direction along the guide rail 22 to completely uncover the opening 20. Guide features (discussed in detail below) are provided on the sliding window panel 18 that cooperate with the guide rail 22 to define and facilitate this path of movement.

Figure 4:
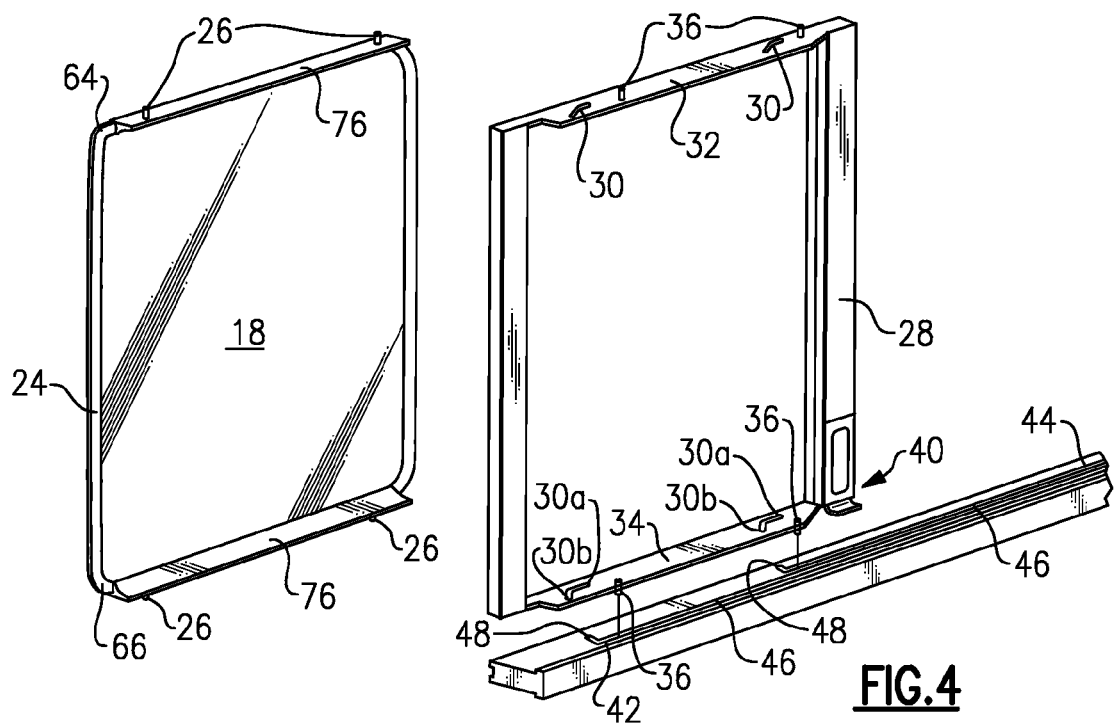
FIG. 4 is an exploded view of the sliding window assembly of FIGS. 2-3.

As shown in FIG. 4, a first frame 24, comprising a window frame, surrounds an outer peripheral edge of the sliding window panel 18. The first frame 24 includes four guide pins 26, with two guide pins 26 being located at a top edge 64 and two guide pins 26 being located at a bottom edge 66. The first frame 24 includes side edges 68 that extend between the top 64 and bottom 66 edges. Flange portions 76 extend inwardly from the top 64 and bottom 66 edges. The guide pins 26 are formed within these flange portions 76.

A second frame 28, which comprises a locking frame, is coupled for movement with the first frame 24. The second frame 28 includes a plurality of slots 30 that receive the guide pins 26 of the first frame 24. Two slots 30 are located in a top flange 32 of the second frame 28 and two slots 30 are located in a bottom flange 34 of the second frame 28. One pin 26 is received within each slot 30. The slots 30 comprise coulisse guides that have an angled configuration to draw the sliding window panel 18 to the offset position. Each slot 30 includes at least a first portion 30a that extends in a generally lateral direction along a length of the top 32 and bottom 34 flanges and a second portion 30b that extends at an oblique angle relative to the first portion 30a. In some instances, the second frame 28 is only partially illustrated in the attached FIGS.

The second frame 28 also includes four guide pins 36, with two guide pins 36 being located within the top flange 32 and two guide pins 36 being located in the bottom flange 34. It should be understood that while four guide pins 26, 36 are shown for each of the first 24 and second 28 frames, fewer or additional guide pins could be used as needed. Further, the configuration and shapes of the slots 30 can be varied as needed to control movement of the sliding window panel 18.

A locking mechanism 40 is supported by the second frame 28. The locking mechanism 40 is coupled to the guide rail 22 to lock the sliding window panel 18 in the closed position. To unlock the sliding window panel 18, a user manually actuates the locking mechanism 40 to release the locking mechanism 40 from the guide rail 22. The user can then slide the sliding window panel 18 to the offset position and then into the fully open position by sliding the window panel 18 along the guide rail 22. In the example shown, the locking mechanism 40 comprises a press-key that is pressed by the user to move the locking mechanism 40 between locked and unlocked conditions.

The guide rail 22 includes first 42 and second 44 guide grooves that define a path of movement for the sliding window panel 18. The first 42 and second 44 guide grooves are discrete grooves, i.e. the grooves are separate from each other. Each of the first 42 and second 44 guide grooves includes a main portion 46 that is generally parallel to the bottom edge 38a of the fixed window panel 12, which extends in a lateral direction, i.e. in a direction along a length of the window panel 12. The main portions 46 of the first 42 and second 44 guide grooves are spaced apart from and parallel to each other. Each of the first 42 and second 44 guide grooves also includes an angled portion 48 that transitions from the main portion 46 at an oblique angle.

The guide pins 26 of the first frame 24 are guided in the slots 30 of the second frame 28 and in the first 42 and second 44 guide grooves of the guide rail 22. One guide pin 26 on the bottom edge 66 extends through one slot 30 and into the first guide groove 42, and the other guide pin 26 extends through the other slot 30 and into the second guide groove 44. One of the guide pins 36 in the bottom flange 34 of the second frame 28 is received within one of the first 42 and second 44 guide grooves and the other guide pin 36 is received within the other of the first 42 and second 44 guide grooves. The guide pins 26, 36 cooperate with the guide slots 30, and first 42 and second 44 guide grooves, to control the movement of the sliding window panel 18 to the offset position, and then to the fully open position. During closing, the guide pins 26 and slots 30 cooperate to tightly press the first frame 24 against edges of the opening 20 to provide a tightly sealed configuration.

Figure 5:
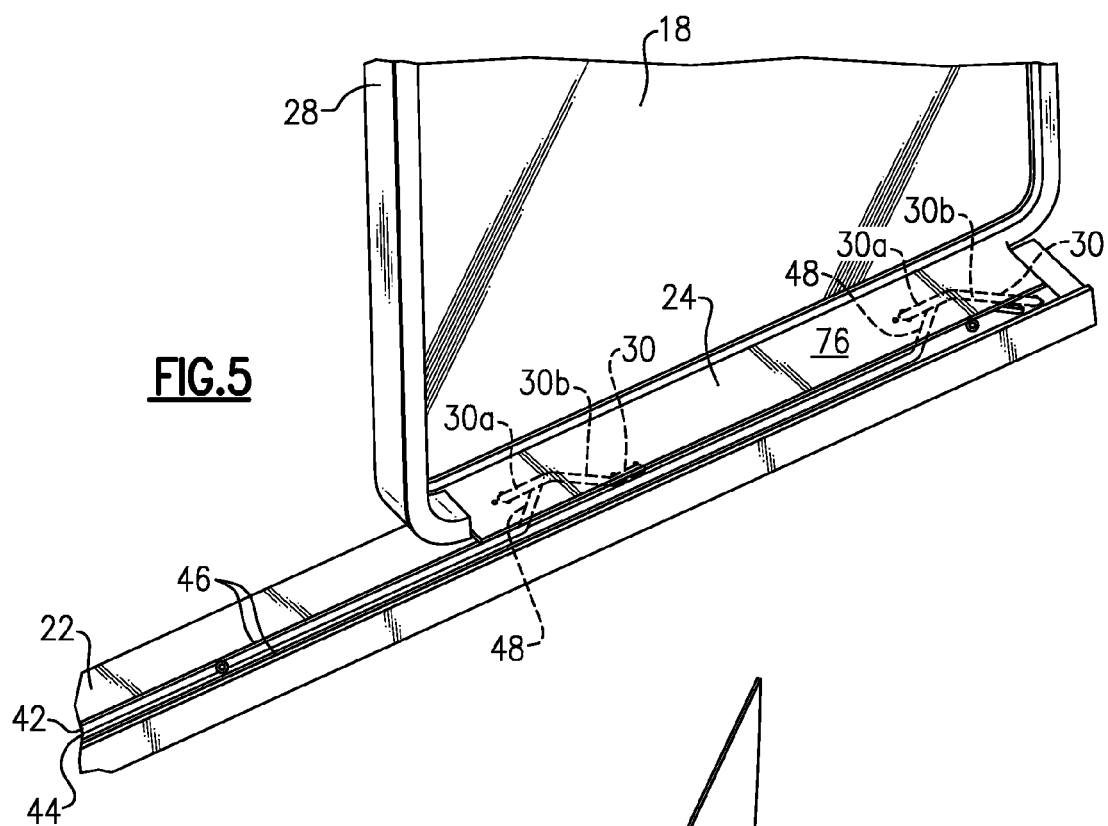
FIG. 5 is a magnified view of guide slots in a locking frame overlapping guide grooves in a guide rail when the sliding window assembly of FIG. 4 is assembled.

FIG. 5 shows a magnified view of the overlapping relationship between the slots 30 and the angled portions 48 of the first 42 and second 44 guide grooves. As the guide pins 26 move within the slots 30, the edges of the slots 30 cooperate with the pins 26 to force the pins 26 inwardly along the angled portions 48 of the first 42 and second 44 guide grooves, which pulls the sliding window panel 18 to the offset position. Then, the pins 26, 36 can be slid along the main portions 46 of the first 42 and second 44 guide grooves to fully uncover the opening 20.

Figure 6:
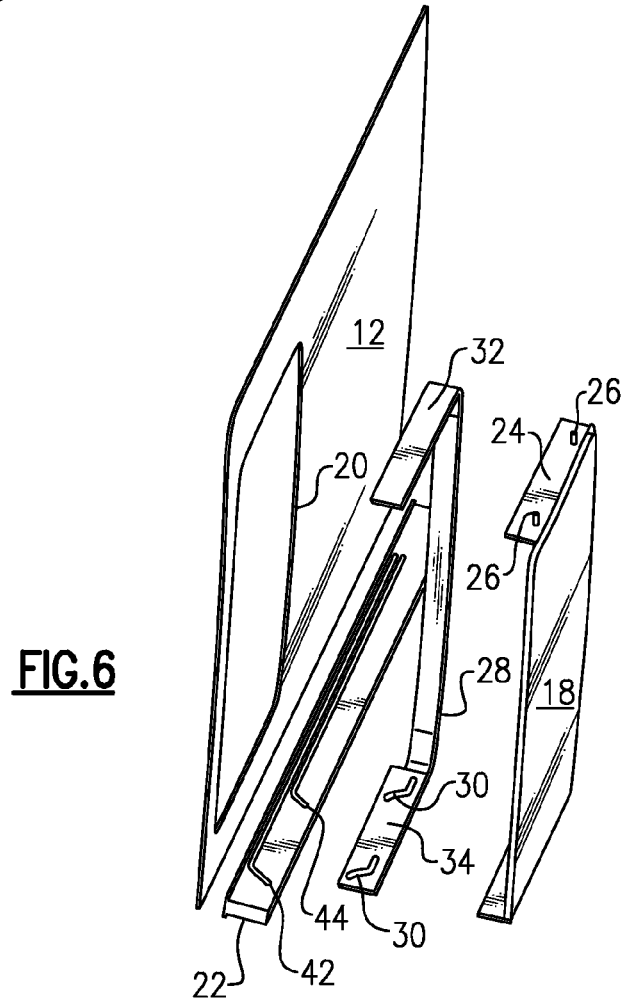
FIG. 6 is a partial exploded view of the sliding window assembly in relation to a fixed window panel.
Figure 7:
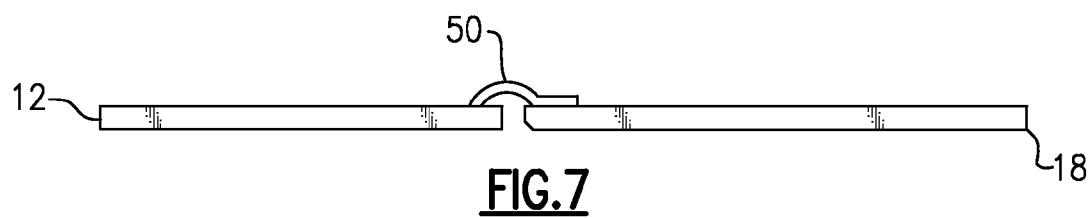
FIG. 7 is a cross-sectional view of a seal provided between the sliding and fixed window panels.

FIG. 6 shows an exploded view of the fixed window panel 12, the guide rail 22, the second frame 28, and first frame 24 and the sliding window panel 18. The first 24 and second 28 frames are coupled together in an overlapping relationship by the guide pins 26 and guide slots 30. This allows the first 24 and second 28 frames to move together as a unit when the sliding window panel 18 is moved toward the fully open position.

FIGS. 7-10 show a seal 50 that is installed between the sliding window panel 18 and the fixed window panel 12. The seal 50 can be mounted to the fixed window panel 12 or can be mounted for movement with the sliding window panel 18. The seal 50 provides a tight sealed interface between the fixed 12 and sliding 18 window panels to prevent water intrusion.

Figure 8:
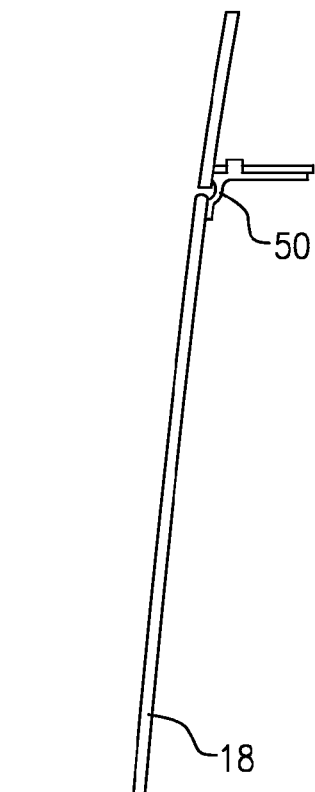
FIG. 8 is another cross-sectional view of a seal provided between the sliding and fixed window panels.
Figure 9:
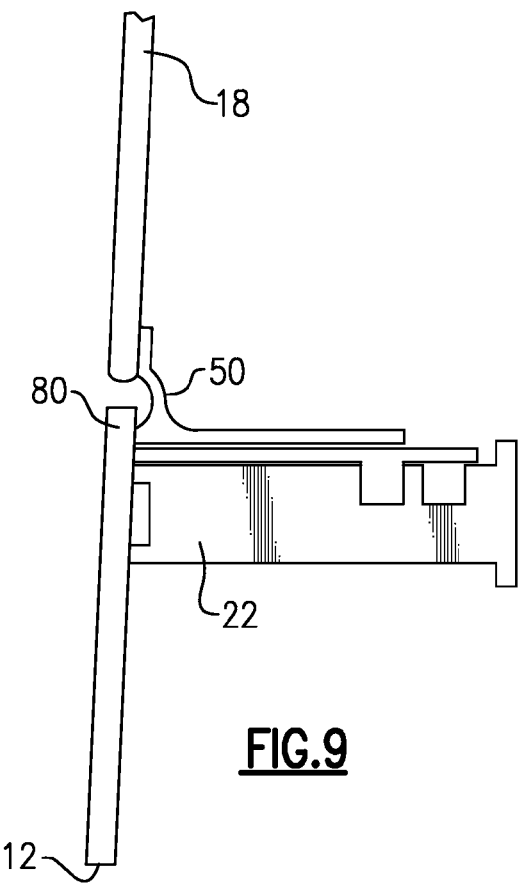
FIG. 9 is a magnified view of the seal of FIG. 8.
Figure 10:
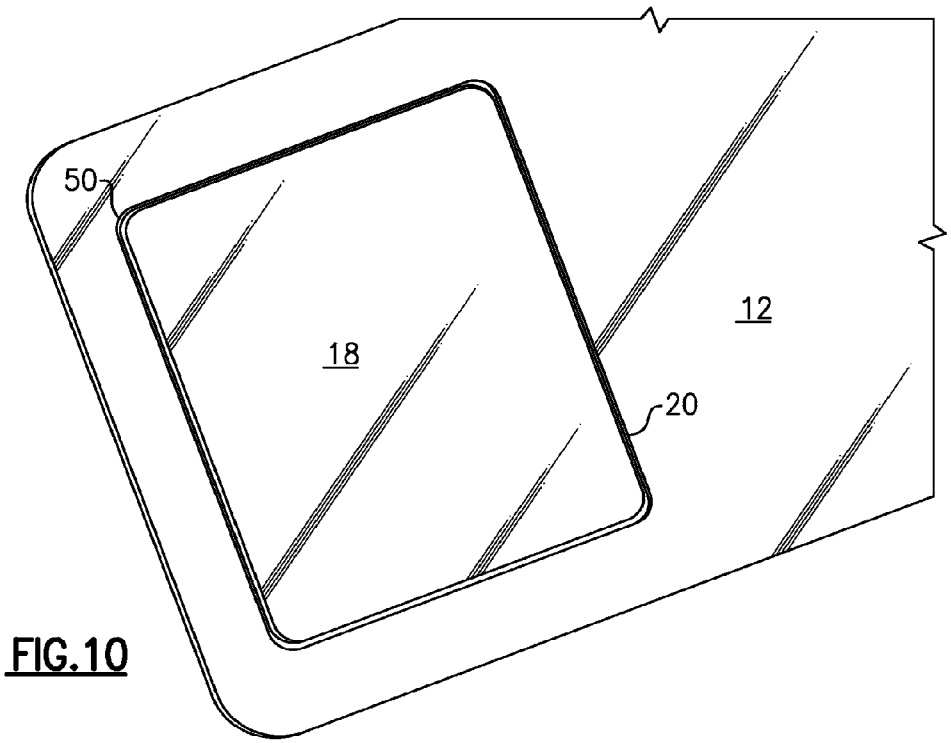
FIG. 10 is a perspective view of the seal surrounding the sliding window panel.

In one example shown in FIGS. 8 and 10, the seal 50 completely surrounds the sliding window panel 18. As shown in FIGS. 8-9, guide rail 22 is positioned with an upper surface that is slightly below an edge 80 of the opening 20 such that the seal 50 can abut against an exposed portion of the fixed window panel 12 at this edge 80.

Figure 11:
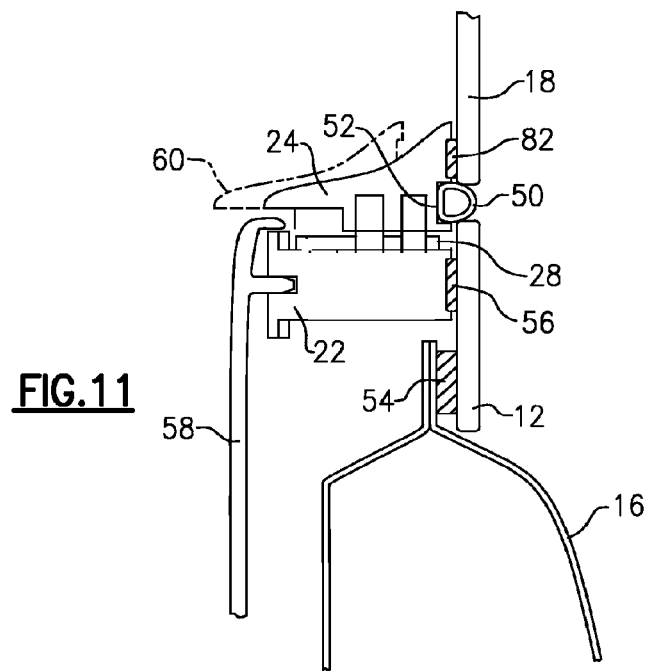
FIG. 11 is a section taken along section lines 11-11 as identified in FIG. 1.
Figure 12:
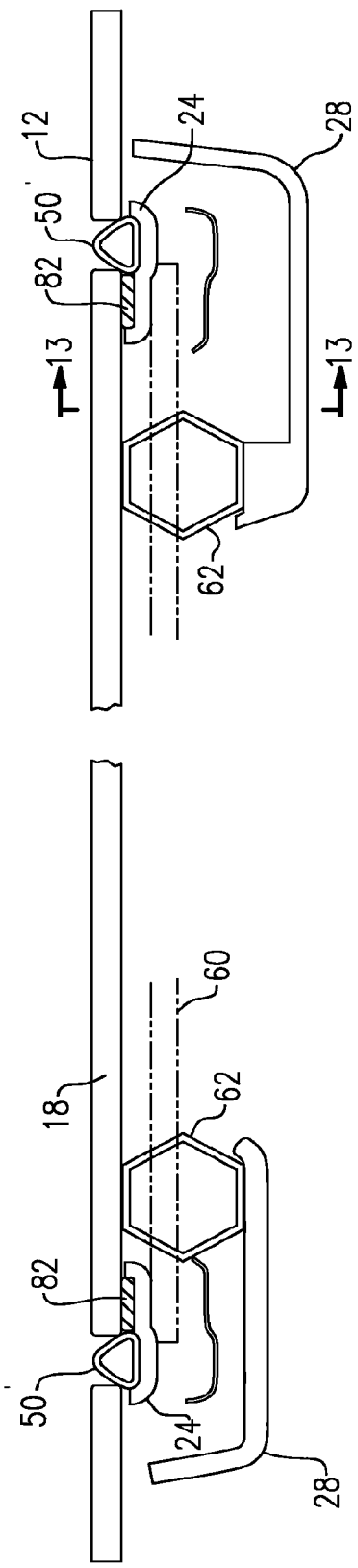
FIG. 12 is a section taken along section lines 12-12 as identified in FIG. 1.
Figure 13:
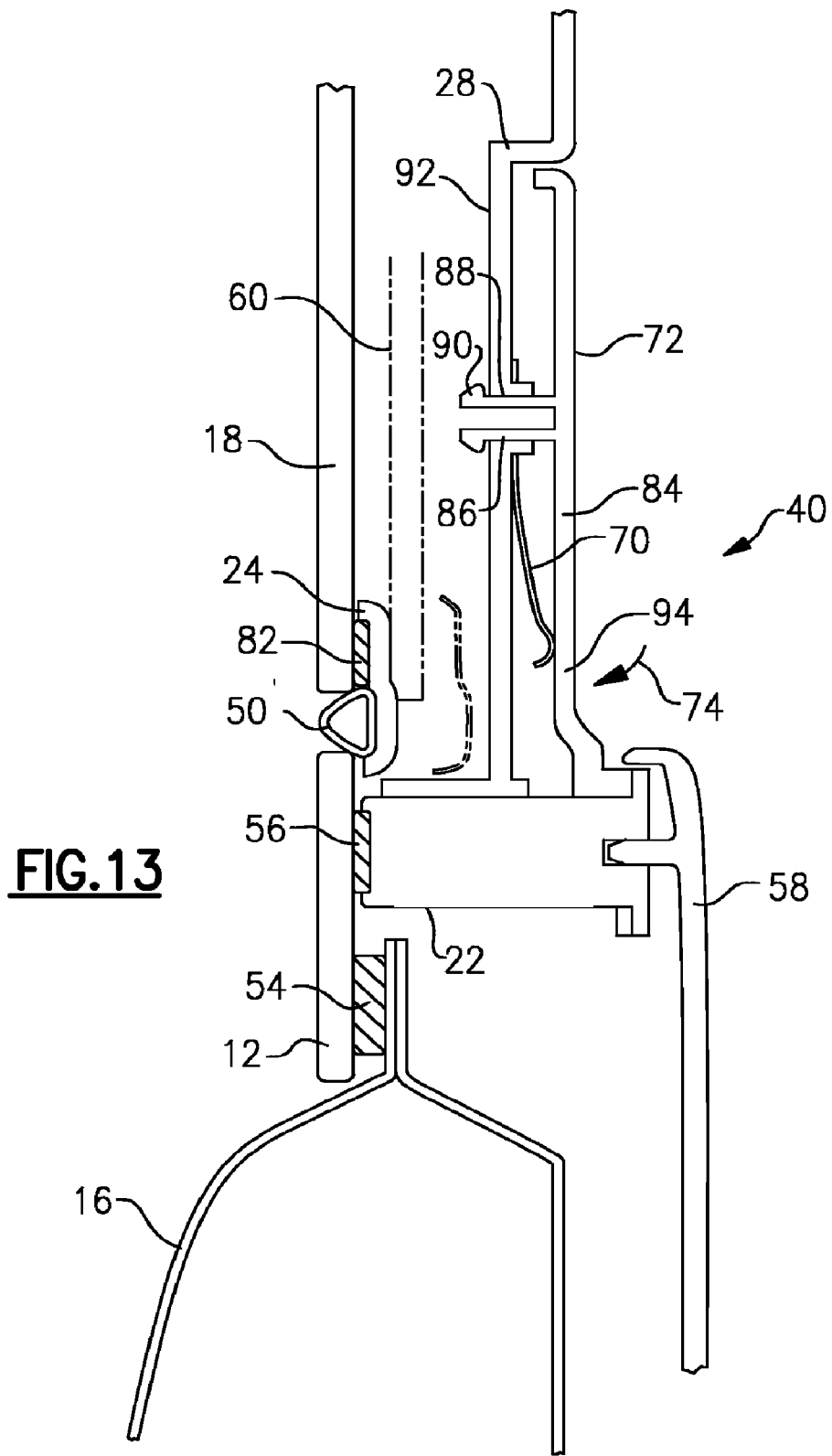
FIG. 13 is a section taken along section lines 13-13 as identified in FIG. 12.

FIG. 11 shows a sectional view taken along lines 11-11 of FIG. 1. This view shows an inner trim 58 that is fixed to the guide rail 22. The guide rail 22 is shown with opposite sets of upper and lower guide grooves such that the same component can be used for an upper guide rail and a lower guide rail. In FIGS. 11-13, a seal 50' is positioned between the fixed 12 and sliding 18 window panels and is engaged within a groove 52 in the first frame 24. The fixed window panel 12 is mounted to the vehicle body 16 with an attachment member 54, which could be adhesive for example. The guide rail 22 is also attached to the fixed window panel 12 with an attachment member 56, such as adhesive for example. The first frame 24 is fixed to the sliding window panel 18 with an attachment member 82, such as adhesive for example.

FIG. 11 shows the sliding window panel 18 in the closed position where the sliding window panel 18 is flush with the fixed window panel 12. When the locking mechanism 40 is unlocked, the sliding window panel 18 can be moved to the offset position, which is indicated by the dashed lines 60.

FIG. 12 shows a sectional view taken along lines 12-2 of FIG. 1. This view shows an inner seal 62 that is positioned between the sliding window panel 18 and the second frame 28. Again, the sliding window panel 18 is shown in the flush/closed position, with the offset position being shown by dashed lines 60.

FIG. 13 shows a sectional view taken along lines 13-13 of FIG. 12. This view shows the locking mechanism 40 in greater detail. A resilient member 70 biases a lock member 72 to the locked position. The lock member 72 is fixed to the second frame 28. In one example, the lock member 72 comprises a press key with a body 84 that includes a protrusion 86 that is received within an opening 88 in the second frame 28. In this example, the protrusion 86 comprises a snap-fit attachment component with tangs 90 that engage an opposing side 92 of the second frame 28 to secure the lock member to the second frame 28.

A press portion 94 of the body 84 of the lock member 72 is pressed against the biasing force, as indicated by arrow 74, to unlock the locking mechanism 40 such that the sliding window panel 18 can be moved to the offset position and then to the fully open position. This mechanical locking motion is advantageous from an anti-theft perspective and stays in position during door slam events.

It should be understood that while the example shown in the attached figures is manually operated, a power actuator could also be used.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A sliding window assembly for a vehicle comprising:
    a fixed window panel including an opening;
    a sliding window panel configured to be received within the opening;
    at least one guide rail mounted proximate to the opening;
    a first frame secured to a periphery of the sliding window panel, the first frame having an upper flange portion extending away from an upper edge of the sliding window panel in a first direction and a lower flange portion extending away from a lower edge of the sliding window panel in the first direction;
    a pair of guide pins extending away from the upper flange portion;
    a pair of guide pins extending away from the lower flange portion;
    a second frame configured to slidably receive the first frame therein, the second frame having an upper flange portion and a lower flange portion, wherein the upper flange portion of the second frame has a pair of guide slots configured to slidably receive the pair of guide pins of the upper flange portion of the first frame therein and wherein the lower flange portion of the second frame has a pair of guide slots configured to slidably received the pair of guide pins of the lower flange portion of the first frame therein;
    a pair of guide pins extending away from the lower flange portion of the second frame, wherein the pair of guide pins of the lower flange portion of the first frame and the pair of guide pins of the lower flange portion of the second frame are each slidably received within a pair of guide grooves of the at least one guide rail, wherein the pair of guide slots of the upper flange portion and the lower flange portion of the second frame are configured to allow for slidable movement of the first frame within the second frame and wherein the pair of guide grooves of the at least one guide rail are configured to allow for slidable movement of the second frame and the first frame away from the opening in the fixed window panel; and
    a locking mechanism that cooperates with at least one of said first and said second frames to selectively lock said sliding window panel to said at least one guide rail.

2. The sliding window assembly according to claim 1 wherein said fixed window panel comprises a single-piece panel.

3. The sliding window assembly according to claim 1, wherein the pair of guide grooves are spaced apart and parallel to each other and wherein each of the pair of guide grooves have a first angled portion configured to move the first frame within the second frame as the pair of guide pins extending away from the lower flange portion of the first frame are slidably received therein.

4. The sliding window assembly according to claim 3 wherein each of the pair of guide grooves have a main portion coupled to the angled portion wherein the main portion is configured to guide the first frame and the second frame away from the opening as the pair of guide pins extending away from the lower flange portion of the first frame and the second frame are slidably received therein.

5. The sliding window assembly according to claim 4 wherein each guide slot includes a laterally extending portion and at least one angled portion extending at an oblique angle relative to said laterally extending portion.

6. The sliding window assembly according to claim 1 wherein said first frame completely surrounds an outer peripheral edge of said sliding window panel and wherein said second frame completely surrounds the first frame.

7. The sliding window assembly according to claim 1 further comprises a seal configured to be disposed between a peripheral edge of the opening and a peripheral edge of the sliding window panel when the sliding window panel is located within the opening.

8. The sliding window assembly as in claim 7, wherein the seal is received within a groove of the first frame.

9. The sliding window assembly as in claim 7, further comprising another seal located between the second frame and the sliding window panel.

10. The sliding window assembly as in claim 9, wherein the seal is received within a groove of the first frame.

11. The sliding window assembly according to claim 1 wherein said locking mechanism includes a lock member movably secured to the second frame and wherein a resilient member provides a biasing force to the lock member and wherein the lock member further comprises a portion configured to releasably engage the at least one guide rail.

12. The sliding window assembly as in claim 1, wherein the upper flange portion of the first frame extends completely across an upper edge of the sliding window panel and the lower flange portion of the first frame extends completely across a lower edge of the sliding window panel and wherein the pair of guide pins of the upper flange portion and the lower flange portion of the first frame are laterally spaced from each other.

13. The sliding window assembly as in claim 1, wherein the upper flange portion of the second frame further comprises a pair of guide pins configured to be slidably received within another guide rail mounted proximate to the opening of the fixed window panel.

14. The sliding window assembly as in claim 1, wherein the pair of guide slots of the upper flange portion and the lower flange portion of the second frame each comprise a first portion and a second portion angularly offset with respect to the first portion and wherein the pair of guide slots of the upper flange portion and the lower flange portion of the second frame are configured to move the first frame and the sliding window panel in the first direction as the sliding window panel is moved away from the opening.

15. A sliding window assembly for a vehicle comprising:
a fixed window panel including an opening;
a sliding window panel configured to be received within the opening;
at least one guide rail mounted proximate to the opening;
a window frame secured to a periphery of the sliding window panel, said window frame having an upper flange portion extending away from an upper edge of the sliding window panel in a first direction and a lower flange portion extending away from a lower edge of the sliding window panel in the first direction;
a pair of guide pins extending away from the upper flange portion of the window frame;
a pair of guide pins extending away from the lower flange portion of the window frame;
a locking frame configured to slidably receive the window frame therein, the locking frame having an upper flange portion and a lower flange portion, wherein the upper flange portion has a pair of slots configured to slidably receive the pair of guide pins of the upper flange portion of the window frame therein and wherein the lower flange portion of the locking frame has a pair of slots configured to slidably receive the pair of guide pins of the lower flange portion of the window frame therein;
a pair of guide pins extending away from the lower flange portion of the locking frame, wherein the pair of guide pins of the lower flange portion of the window frame and a pair of guide pins of the lower flange portion of the locking frame are each slidably received within a pair of guide grooves of the at least one guide rail, wherein the pair of guide slots of the upper flange portion and the lower flange portion of the locking frame are configured to allow for slidable movement of the window frame within the locking frame in the first direction and wherein the pair of guide grooves of the at least one guide rail are configured to allow for slidable movement of the locking frame and the window frame away from the opening in a second direction only after movement of the window frame within the locking frame away from the opening in the first direction has occurred; and
a locking mechanism that cooperates with said locking frame to selectively lock said sliding window panel to said at least one guide rail.

16. The sliding window assembly according to claim 15 wherein said locking mechanism further comprises a press key that includes a locking lever movably secured to the locking frame and a resilient member configured to provide a biasing force to the locking lever and wherein the locking lever further comprises a portion configured to releasably engage the at least one guide rail when the sliding window panel is positioned within the opening.

17. The sliding window assembly according to claim 15, further comprising a seal configured to be disposed between a peripheral edge of the opening and a peripheral edge of the sliding window panel when the sliding window panel is located within the opening.

18. The sliding window assembly as in claim 17, wherein the seal is received within a groove of the locking frame.

19. The sliding window assembly as in claim 17, further comprising another seal located between the locking frame and the sliding window panel.

20. The sliding window assembly as in claim 17, wherein the seal is received within a groove of the window frame and wherein the upper flange portion of the window frame extends completely across an upper edge of the sliding window panel and the lower flange portion of the window frame extends completely across a lower edge of the sliding window panel and wherein the pair of guide pins of the upper flange portion and the lower flange portion of the window frame are laterally spaced from each other and wherein the upper flange portion of the locking frame further comprises a pair of guide pins configured to be slidably received within another guide rail mounted proximate to the opening of the fixed window panel.

* * * * *